United States Patent Office.

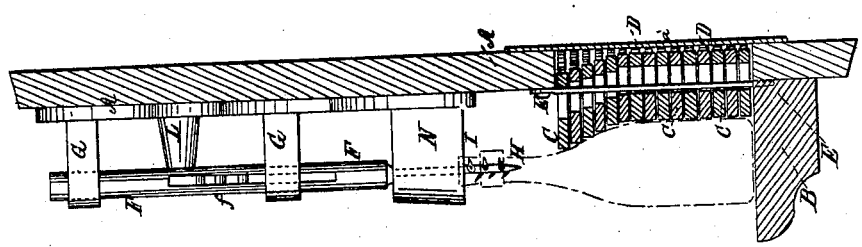
C. G. Wilson.
Cork Screw.
N° 92552.   Patented Jul. 13, 1869.
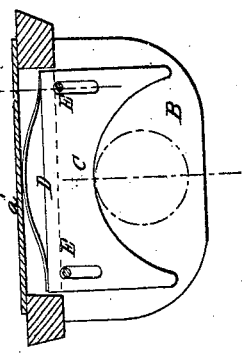
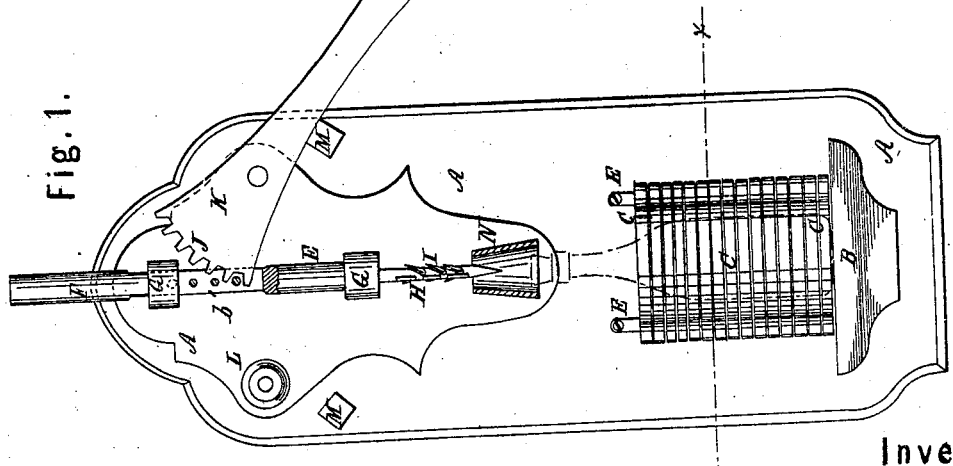
Witnesses.
Chas. Nida
O. Hinchman
Inventor.
Chas G Wilson
per [signature]
Attorneys.

CHARLES G. WILSON, OF BROOKLYN, NEW YORK.

Letters Patent No. 92,552, dated July 13, 1869.

IMPROVED CORK-EXTRACTOR.

The Schedule referred to in these Letters Patent and making part of the same.

*To all whom it may concern:*

Be it known that I, CHARLES G. WILSON, of Brooklyn, in the county of Kings, and State of New York, have invented a new and improved Cork-Extractor; and I do hereby declare that the following is a full, clear, and exact description thereof, which will enable others skilled in the art to make and use the same, reference being had to the accompanying drawings, forming part of this specification, in which—

Figure 1 is a front view of my improved device, parts being broken away to show the construction.

Figure 2 is a vertical longitudinal section of the same.

Figure 3 is a detail horizontal section of the same, taken through the line $x\ x$, fig. 1.

Similar letters of reference indicate corresponding parts.

My invention has for its object to furnish a simple and convenient machine for extracting corks instantly from beer, wine, and other bottles, without the necessity of previously removing the wires or capsules from said bottles; and It consists in the construction and combination of the various parts of the machine, as hereinafter more fully described.

A represents a board or plate, to which the various parts of the machine are attached, and which is designed to be attached to a wall, pillar, or other suitable support, near the place where the bottles are to be uncorked.

To the lower part of the board or plate A, is attached a shelf, B, to support the bottle while being uncorked.

C is a series of horizontal plates, the forward edges of which are curved, as shown in fig. 3, and the rear edges of which enter a recess in the plate or board A, and rest against springs D, by which they are held forward.

The springs D are supported by the plate $a'$, attached to the board or plate A, as shown in fig. 2.

The movement of the plates C is limited by the rods E, that pass through slots in said plates, as shown in figs. 1, 2, and 3.

F is a rod or bar, which moves up and down vertically, through guides G, attached to the plate A, and to the lower end of said rod F is attached a pointed bar or spear, H, having barbs I pivoted to its sides or edges, in such a way that they may shut up into recesses in said bar while being forced into the cork, but which will open out as the said bar is drawn back, carrying the cork with it.

Upon the sides of the bar F are formed teeth $f'$, into which mesh the teeth J, formed upon the circular end of the lever K, which is pivoted to a short post or support L, attached to the board or plate A.

The movement of the lever K is limited by the stop M, attached to the said board or plate A.

Another support, L, and stop, M, may be attached to the board or plate A, upon the other side of the bar F, so that the lever K may be placed upon either side of the bar F, as may be most convenient.

N is a support, attached to the plate or board A, and which has a conical opening formed through it.

This support is designed to receive the neck of the bottle, and hold it while the cork is being extracted.

In using the device, the neck of the bottle is introduced into the conical opening of the support N. The body of the bottle is then pressed against the plates C, pressing a number of them inward. The rest of the said plates C, projecting above the shoulder or neck of the bottle, serve to support said bottle against the draught-strain while the cork is being withdrawn. The outer end of the lever K is then raised, forcing the barbed-pointed bar H I down into the cork; and, as the said outer end of the lever K is again lowered, the cork is withdrawn from the bottle, without its having been necessary to remove or break the wire or capsule.

It is not necessary to remove the cork from the bar H I before the machine is again used for extracting another cork, as the first one will split and drop off as the machine is applied to the second one.

Having thus described my invention,

I claim as new, and desire to secure by Letters Patent—

An improved machine for extracting corks, formed by the combination of the series of spring-plates C D E, barbed bar H I, rack or racks $f'$, toothed lever J K, guides G, and support N, having a conical opening formed in it, with each other, substantially as herein shown and described, and for the purpose set forth.

The above specification of my invention signed by me, this 20th day of May, 1869.

CHARLES G. WILSON.

Witnesses:
FRANK BLOCKLEY,
C. L. TOPLIFF.